United States Patent
Jakubowski

(10) Patent No.: US 9,271,474 B2
(45) Date of Patent: Mar. 1, 2016

(54) PET STROLLER WITH LATCHABLE CANOPY BAR

(71) Applicant: Vermont Juvenile Furniture Mfg., Inc., West Rutland, VT (US)

(72) Inventor: Chris Jakubowski, Rutland, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 0 days.

(21) Appl. No.: 14/873,316

(22) Filed: Oct. 2, 2015

(65) Prior Publication Data

US 2016/0021843 A1    Jan. 28, 2016

Related U.S. Application Data

(63) Continuation of application No. 14/023,721, filed on Sep. 11, 2013.

(60) Provisional application No. 61/766,835, filed on Feb. 20, 2013.

(51) Int. Cl.
| | | |
|---|---|---|
| *B62B 9/10* | (2006.01) | |
| *A01K 1/02* | (2006.01) | |
| *B62B 9/14* | (2006.01) | |
| *B62B 9/26* | (2006.01) | |

(52) U.S. Cl.
CPC ............... *A01K 1/0236* (2013.01); *B62B 9/14* (2013.01); *B62B 9/26* (2013.01); *B62B 2202/42* (2013.01)

(58) Field of Classification Search
CPC ........ A01K 1/0236; B62B 9/14; B62B 9/142; B62B 9/145
See application file for complete search history.

(56) References Cited

U.S. PATENT DOCUMENTS

| | | | | |
|---|---|---|---|---|
| 1,412,935 | A | * | 4/1922 | Greenebaum ............. B62B 9/14 135/906 |
| 3,193,322 | A | * | 7/1965 | Hines ...................... B62B 9/142 296/102 |
| 5,979,928 | A | * | 11/1999 | Kuo .......................... B62B 7/06 280/642 |
| 6,139,046 | A | * | 10/2000 | Aalund ..................... B62B 7/08 280/47.38 |
| 6,155,579 | A | * | 12/2000 | Eyman .................. B62B 5/0023 280/30 |
| 6,155,628 | A | * | 12/2000 | Williams ................ B62B 9/142 280/47.38 |
| 6,196,161 | B1 | | 3/2001 | Thurber |
| 6,217,099 | B1 | | 4/2001 | McKinney et al. |
| D453,593 | S | | 2/2002 | Licciardello |
| 6,409,206 | B1 | * | 6/2002 | Willrich .................... B62B 9/00 261/DIG. 3 |
| D475,660 | S | | 6/2003 | Licciardello |
| 6,584,937 | B1 | * | 7/2003 | Ludolph ............. A01K 1/0236 119/453 |

(Continued)

OTHER PUBLICATIONS

* "Pet Gear Guide, Dog Version, Dog Paradise 2011", p. 160, SankeiMedix, inc. Apr. 2011. *.

(Continued)

*Primary Examiner* — Katy M Ebner
(74) *Attorney, Agent, or Firm* — Volpe and Koenig, P.C.

(57) ABSTRACT

A pet stroller having a frame assembly and a cloth platform enclosure connected to a platform enclosure member that defines a base and a sidewall of a pet seating area. Upper and lower canopy bars are pivotably connected to the rear pivot blocks that are pivotable to extend or retract a canopy over the pet seating area. A cloth canopy assembly is connected to the handle and the upper and lower canopy bars. A latch assembly is connected to the platform enclosure member and is movable to a latched position in which it clamps the lower canopy bar to the platform enclosure member to form an enclosed pet seating area.

7 Claims, 8 Drawing Sheets

(56) References Cited

U.S. PATENT DOCUMENTS

| | | | | |
|---|---|---|---|---|
| 6,786,181 B1* | 9/2004 | Leanheart | ............ | A01K 1/0236 119/453 |
| 6,866,008 B1 | 3/2005 | Havard | | |
| 7,090,242 B1* | 8/2006 | Sheinall | ............... | A01K 1/0236 119/496 |
| 7,261,060 B1* | 8/2007 | Garofola | ............... | A01K 1/0236 119/482 |
| 7,556,040 B2* | 7/2009 | Meyer | ................. | A61G 10/026 128/202.12 |
| 7,568,450 B2* | 8/2009 | Chen | .................... | A01K 1/0254 119/453 |
| 7,690,675 B2 | 4/2010 | Britton et al. | | |
| 8,347,815 B2* | 1/2013 | Leung | ................... | A01K 1/0245 119/28.5 |
| 2005/0166861 A1* | 8/2005 | King | .................... | A01K 1/0245 119/496 |
| 2005/0168006 A1* | 8/2005 | Darland | .................... | B62B 9/14 296/97.21 |
| 2006/0169218 A1 | 8/2006 | Chang | | |
| 2009/0066123 A1* | 3/2009 | Kassai | .................... | B62B 9/142 297/184.13 |
| 2009/0096257 A1* | 4/2009 | Gordon | .................. | B62B 9/142 297/184.12 |
| 2009/0101189 A1* | 4/2009 | Tatham | .................. | B62B 9/142 135/88.02 |
| 2009/0314219 A1 | 12/2009 | Bryson | | |

OTHER PUBLICATIONS

* Sport Pet Stroller, Pet Gear, [online], Mar. 13, 2012, [Retrieved on Dec. 19, 2014]. Inernet <URL, https://web.archive.org/web/20120313032541/http://www.petgearinc.com/product_infor.asp?id=373>. *.

Happy Trails Stroller, Pet Gear, [online], [Retrieved on Sep. 30, 2015], Internet <URL, https://petgearinc.com/product_info.asp?id=4>.

* cited by examiner

PET STROLLER WITH LATCHABLE CANOPY BAR

INCORPORATION BY REFERENCE

The Following documents are incorporated herein by reference as if fully set forth: U.S. patent application Ser. No. 14/023,721, filed Sep. 11, 2013; and U.S. Provisional Patent Application No. 61/766,835, filed Feb. 20, 2013.

BACKGROUND

The invention relates to a pet stroller, more particularly, to a foldable pet stroller which is openable to a use position, and foldable, when not in use, to a compact storage position.

Foldable pet strollers of the above-noted type are known and can be used for walking small or medium sized pets, such as dogs or cats, in a manner similar to a toddler stroller. These strollers typically are formed with a metal frame having a cloth and mesh holding assembly attached to the metal frame which define a seating area as well as a cloth and mesh canopy. Typically, the metal frame includes front and rear wheel struts which are pivotally connected to a handle and a seating area platform, as well as additional support structure. These frame members are pivotably connected at certain pivot areas to allow pivoting movement between the handle, the front struts and the rear struts in order to extend the frame from the compact storage position to a use position where the handle and struts can be locked in position using lock assemblies, and can then be re-folded back down to the compact storage position upon releasing the locks. In the compact storage position, the handle and struts generally fold to a position adjacent to one another, and the cloth and mesh seating area and canopy generally collapse together.

Typically pet strollers include the canopy having the mesh area so that a pet can be confined in the seating area without having to be clipped or tied in by a lead that is connected to the stroller. In the known pet strollers, this mesh is zipperable to a portion of the pet stroller seating area platform, and can be moved between opened and closed positions. In the unzipped position of the canopy, this leaves a loose mesh as part of the platform seating area sidewall that remains unsupported and floppy in use. With no retaining sidewall area surrounding the pet seating area, even if he pet is connected to a lead, it could jump or slip part way out of the stroller and accordingly, it is necessary for all practical purposes to have the mesh zipper closed while in use.

It would be desirable to provide such a pet stroller with a platform seating area having a sidewall which is defined and usable when the canopy is opened. Further, it would be desirable to provide for a more secure assembly of the platform to the frame in the open, use position of the stroller.

SUMMARY

Briefly stated, a pet stroller is provided having a frame assembly including a handle, a platform member pivotably connected to front and rear wheel assemblies, with the platform member defining a platform base in a use position, and a platform enclosure member connected to the frame assembly that in the use position is generally parallel to the platform member. A cloth platform enclosure is connected to the platform enclosure member and the handle which defines a base and a sidewall of a pet seating area, and upper and lower canopy bars are pivotally connected to the frame assembly to extend or retract a canopy over the pet seating area. A cloth and mesh canopy assembly is connected to the handle and the upper and lower canopy bars. A latch assembly connected is to the platform enclosure member and is movable to a latched position in which it clamps the lower canopy bar to the platform enclosure member to form an enclosed pet seating area.

In another aspect of the pet stroller, the frame assembly includes front and rear wheel struts. The handle has a handle portion that is located between two ends that extend away from the handle portion. The handle is connected to the rear wheel struts by rear pivot blocks located at the top of the rear wheel struts at positions spaced apart from the two ends. The two ends of the handle are connected by front pivot blocks to the tops of the front wheel struts. Moveable lock assemblies are located on the handle adjacent to the ends that are lockable to the front pivot blocks such that the handle is generally aligned with the front wheel struts in a use position of the stroller with the lock assemblies engaged to corresponding ones of the front pivot blocks. The platform member is pivotally connected to the front and rear wheel struts, and supports the platform base in the use position. At least one front crossbar is located between the front struts. The wheel assemblies are located at the bottom ends of the struts. The platform enclosure member is pivotally connected to the rear pivot blocks located on a handle above the lock assemblies that pivots to a use position generally parallel to the platform member. The upper and lower canopy bars are pivotally connected to the rear pivot blocks and are pivotal to extend or retract the canopy over the pet seating area.

The frame assembly can also be for a 3 wheel stroller, and is not limited to a particular number of front or rear wheel struts, and the specific arrangement of the frame members and platform members can be varied. In the 3 wheel embodiment, the platform enclosure member is provided in the use position generally parallel to the platform member, and the cloth platform enclosure is connected to the platform enclosure member and the handle, and defines a base and a sidewall of the pet seating area. The upper and lower canopy bars are also provided and are pivotal to extend or retract a canopy over the pet seating area. The cloth and mesh canopy assembly is connected to the handle and the upper and lower canopy bars, and has a cutout exposing a front portion of the lower canopy bar. The over-center latch assembly is connected to the platform enclosure member in a position aligned with a cutout of the canopy assembly.

In another aspect the invention provides a base board in the cloth platform enclosure, with a clip on the base. The clip is engagable with the platform member in a use position.

In another aspect, the upper and lower canopy bars that are pivotally connected to the rear pivot blocks are pivotal about the same axis, providing simpler assembly.

In another aspect, a lower storage bag is connected to the rear struts and the at least one front crossbar.

In another aspect, the over-center latch includes a base with a recess to receive the lower canopy bar.

Preferably, the canopy assembly is connected to the handle and the lower canopy bar.

In order to allow more compact folding, the base board is preferably provided in two pieces which are movable relative to one another to allow for folding.

Preferably, the pet stroller is foldable to a compact position by releasing the movable lock assemblies on the ends of the handle, releasing the over-center latch, and disengaging the clip on the baseboard from the platform member.

In another aspect, the over-center latch is disengagable in the use position of the stroller, the canopy assembly is movable to an open position, with the platform member, the platform enclosure member, and the cloth platform enclosure remaining in the use position providing a partial enclosure with a sidewall that extends around a complete periphery of the pet seating area.

BRIEF DESCRIPTION OF THE DRAWINGS

The following detailed description of the preferred embodiments of the invention will be better understood when read with reference to the appended drawings. For the purposes of illustrating the invention, there is shown in the drawing an embodiment which is presently preferred. It is understood, however, that the invention is not limited to the precise arrangements and instrumentality shown in the drawings.

DETAILED DESCRIPTION OF THE PREFERRED EMBODIMENTS

Figure 1:
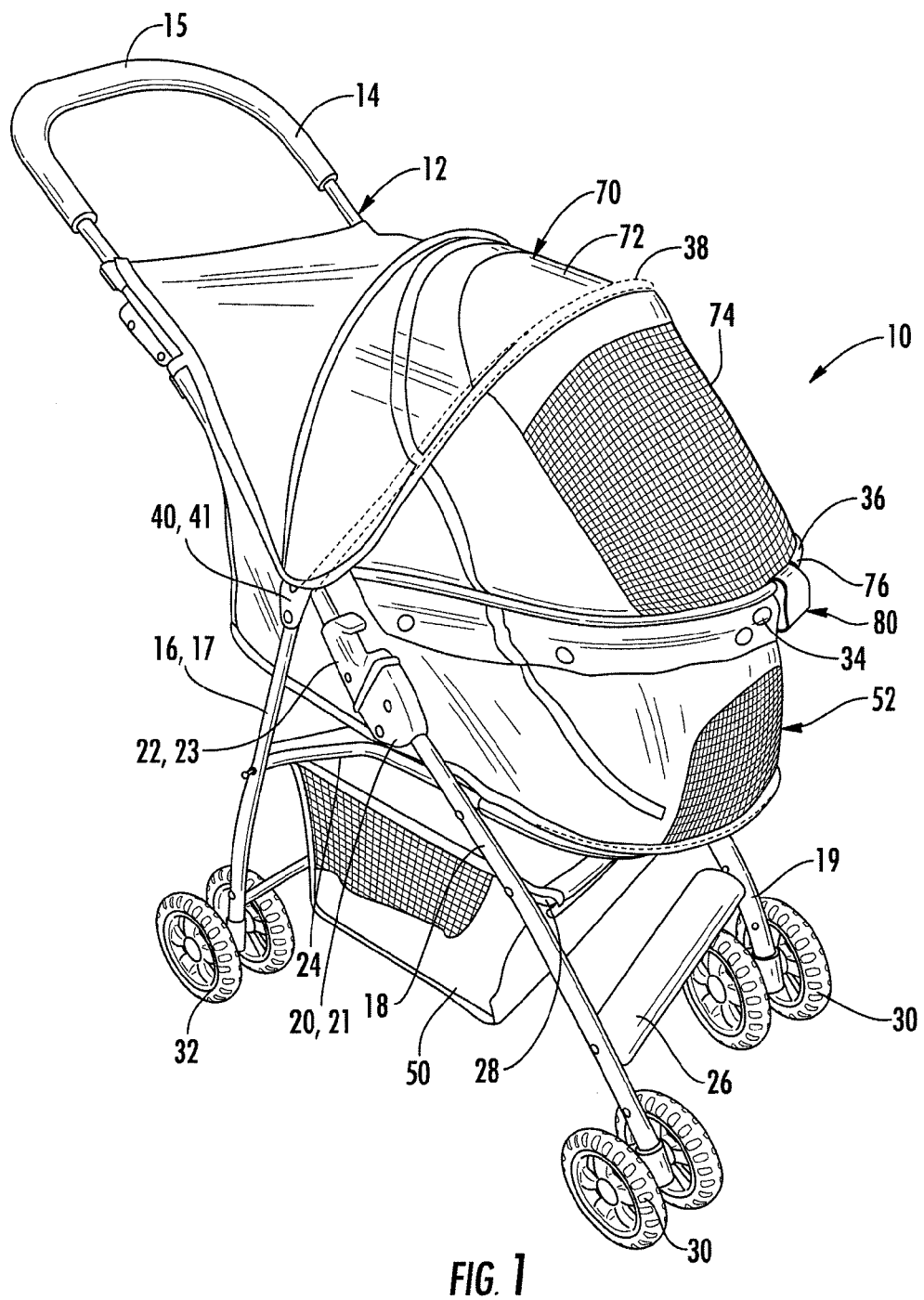
FIG. 1 is a top, front, right perspective view of the pet stroller according to the invention.
Figure 2:
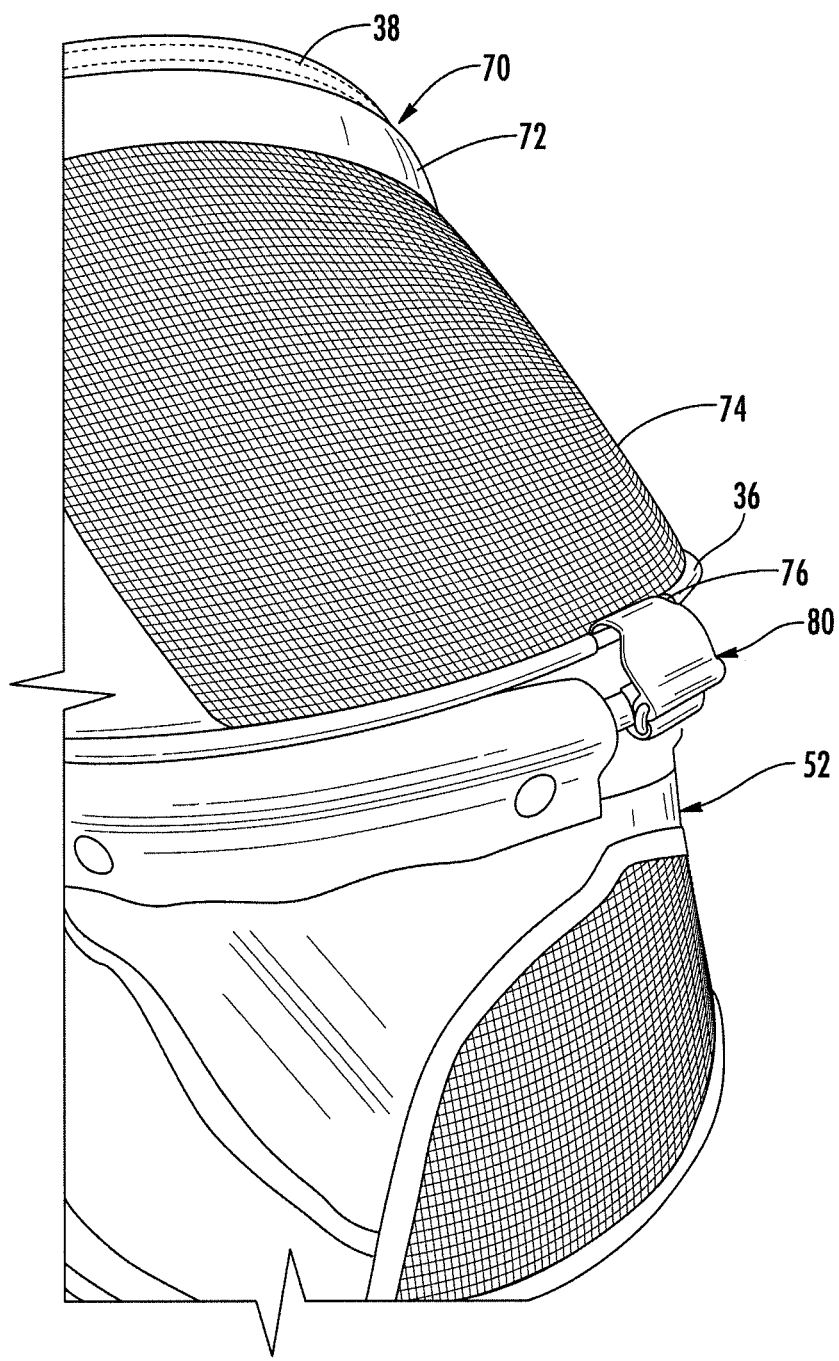
FIG. 2 is an enlarged view of the front portion of the pet stroller shown in FIG. 1 showing the canopy and over-center latch assembly.

Certain terminology is used in the following description for convenience only and is not limiting. The words "right", "left", "top", "bottom", "front", and "back" designate directions in the drawings to which reference is made. The words "inwardly" and "outwardly" refer to directions toward and away from, respectively, the geometric center of the pet stroller and designated parts thereof. This terminology includes the words specifically noted above, derivatives thereof and words of similar import. The words "a" and "one", as used in the claims and in the corresponding portion of the specification, are defined as including one or more of the referenced item unless specifically stated otherwise. A list of items in the form "at least one of A, B, or C" where A, B, and C represent various elements of the invention, means any one of A, B, or C or various combinations thereof.

Figure 5:
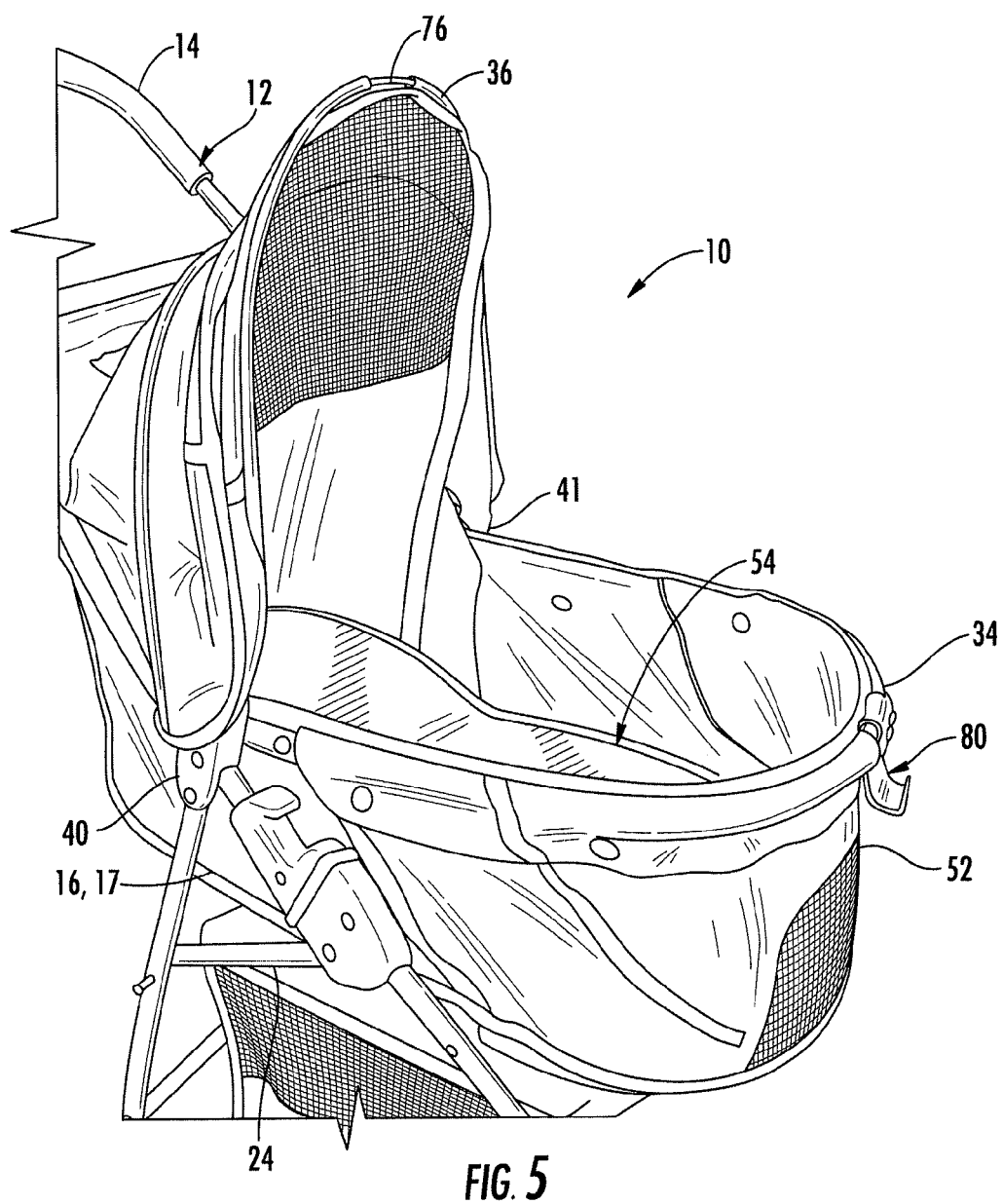
FIG. 5 is a view similar to FIG. 1 showing the canopy in an open position with the over-center latch assembly also open.
Figure 11:
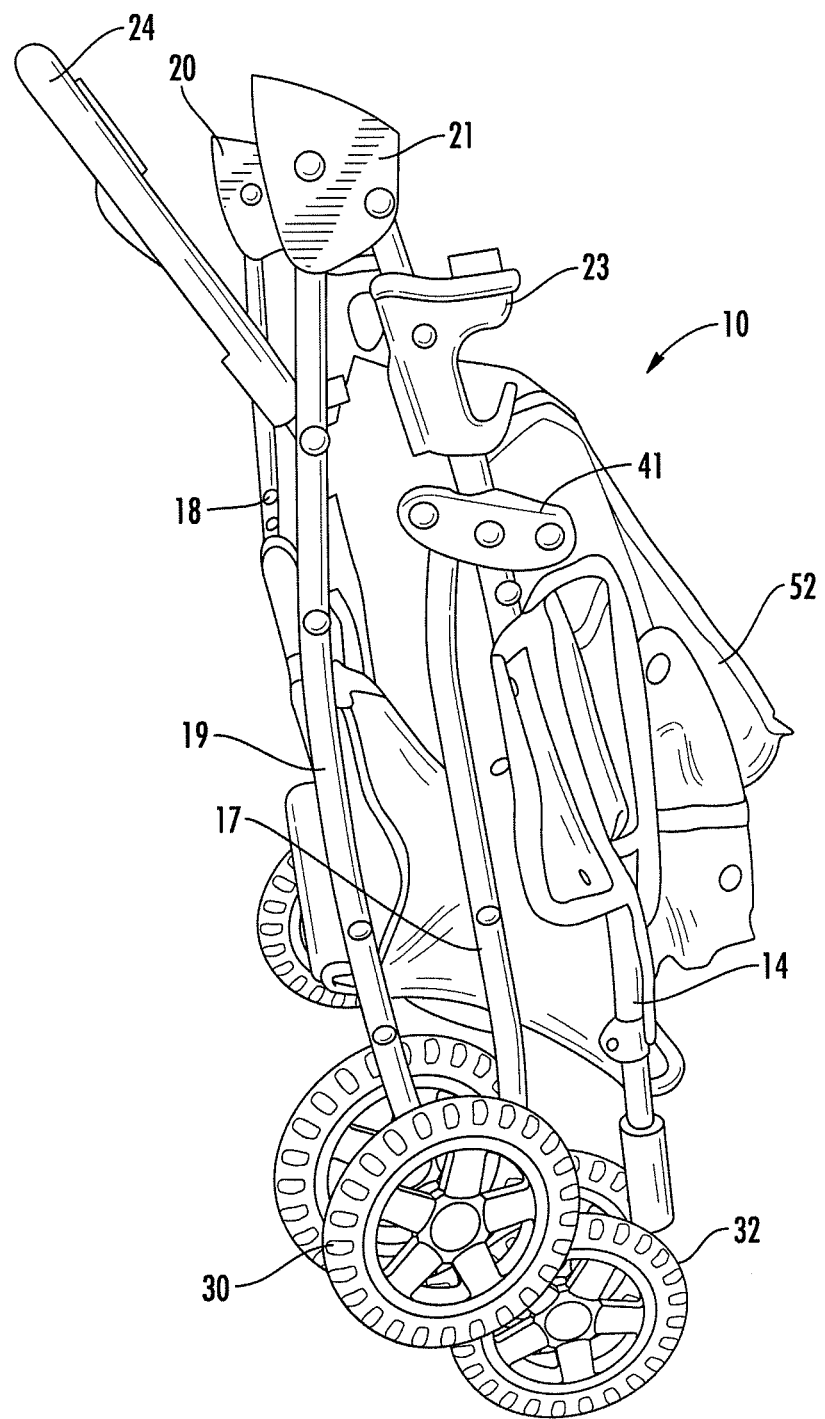
FIG. 11 is a side view showing the pet stroller in a compact folded position.

Referring now to FIGS. 1, 5, and 11, a pet stroller 10 in accordance with the present invention is shown in the use position with the canopy closed (FIG. 1), in the use position with the canopy open (FIG. 5), and in the folded, storage position (FIG. 11). As shown in FIG. 1, the pet stroller 10 includes a frame assembly 12 having two rear wheel struts 16, 17 and two front wheel struts 18, 19. A handle 14, preferably formed as a bent tube, that has a handle portion 15 and two ends that extend away from the handle portion 15 is connected to the frame 12 at the two rear wheel struts 16, 17, by rear pivot blocks 40, 41 (shown most clearly in FIG. 11), which are spaced apart from the two ends of the handle 14. These two ends of the handle 14 are connected by front pivot blocks 20, 21 to the tops of the front wheel struts 18, 19. Movable lock assemblies 22, 23 are located on the handle 14 adjacent to the ends that are lockable to the front pivot blocks 20, 21 such that the handle 14 is generally aligned with the front wheel struts 18, 19 in a use position of the stroller 10, as shown in FIGS. 1 and 5, with the lock assemblies 22, 23 engaged with respective ones of the front pivot blocks 20, 21. The lock assembly 23 is shown in the disengaged position from the front pivot block 21 in FIG. 11. These front pivot blocks 20, 21 and locking assemblies 22, 23 are of the type known in the prior art such as in the Pet Gear Happy Trails™ Pet Stroller (item no. PG8100ST of Pet Gear, Inc., West Rutland, Vt.).

Figure 8:
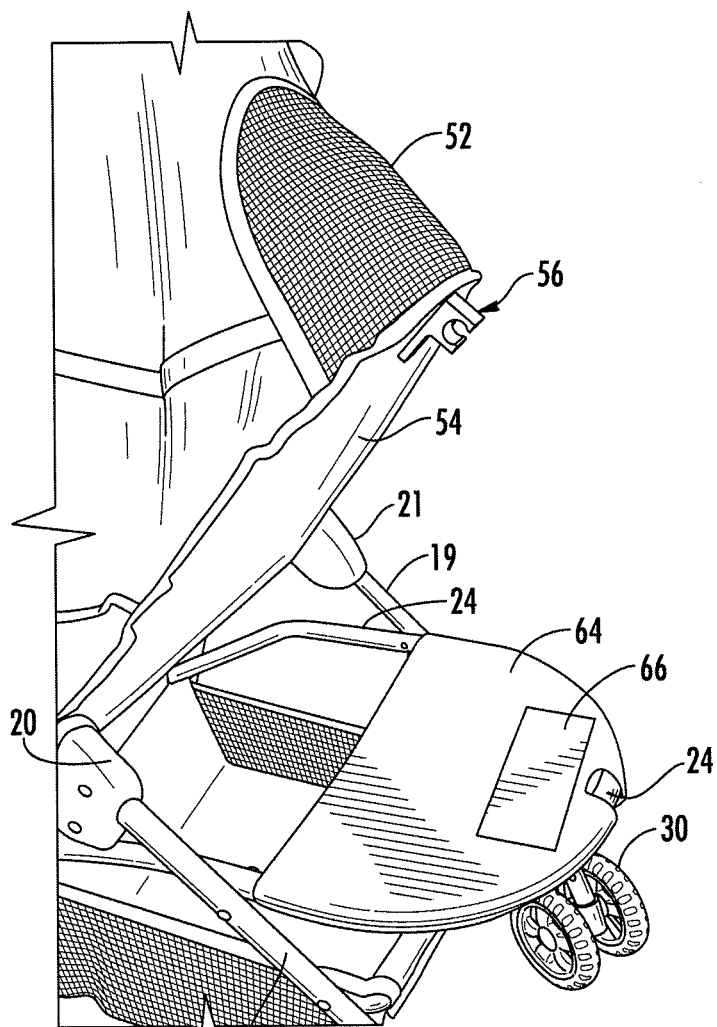
FIG. 8 is a view looking down at the platform member of the frame with the base board not yet in the use position, illustrating the attachment clip.

A platform member 24 is pivotally connected to the front wheel struts 18, 19 and the rear wheel struts 16, 17, as shown most clearly in FIG. 8. This defines a platform base in the use position. At least one front crossbar (26, 28) extends between the front wheel struts 18, 19 and preferably, two front crossbars (26, 28) are provided. Wheel assemblies 30, 32 are preferably connected to the bottoms of the front and rear wheel struts 18, 19; 16, 17 which allow the stroller 10 to be rolled in the use position. Preferably, the front wheel assemblies 30 are double wheels, and the rear wheel assemblies 32 are single wheels. These types of wheel assemblies 30, 32 are also known from the prior art pet stroller from Pet Gear noted above.

Figure 6:
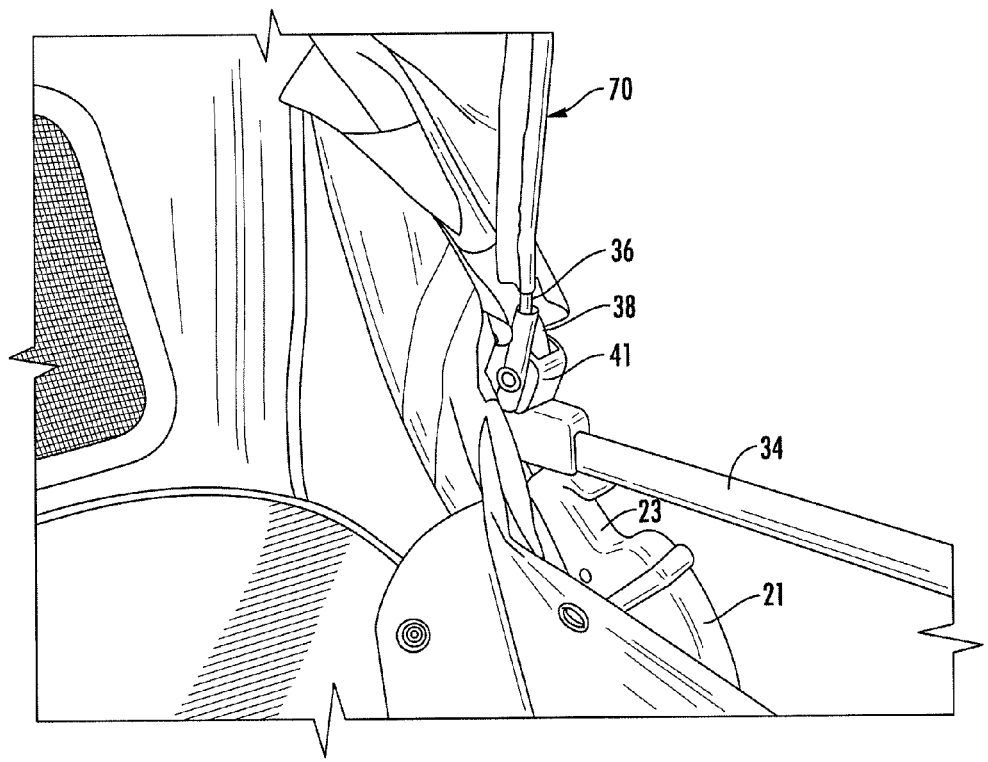
FIG. 6 is an enlarged detail view showing a pivot attachment point of the upper and lower canopy bars to the rear pivot block.

A platform enclosure member 34 is pivotally connected to the rear pivot blocks, shown most clearly in FIGS. 5 and 6, at a position located on the handle 14 above the lock assemblies 22, 23. The platform enclosure member 34 pivots to a use position generally parallel to the platform member 24.

Figure 9:
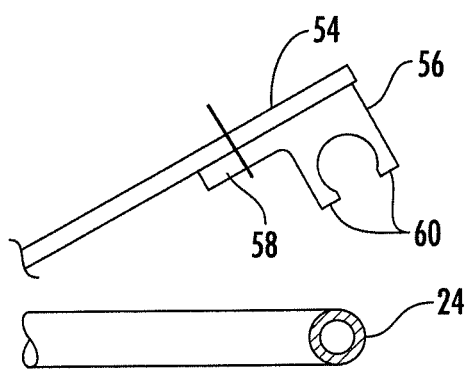
FIG. 9 is a detailed view showing the attachment clip on the base board prior to attachment with the platform member.
Figure 10:
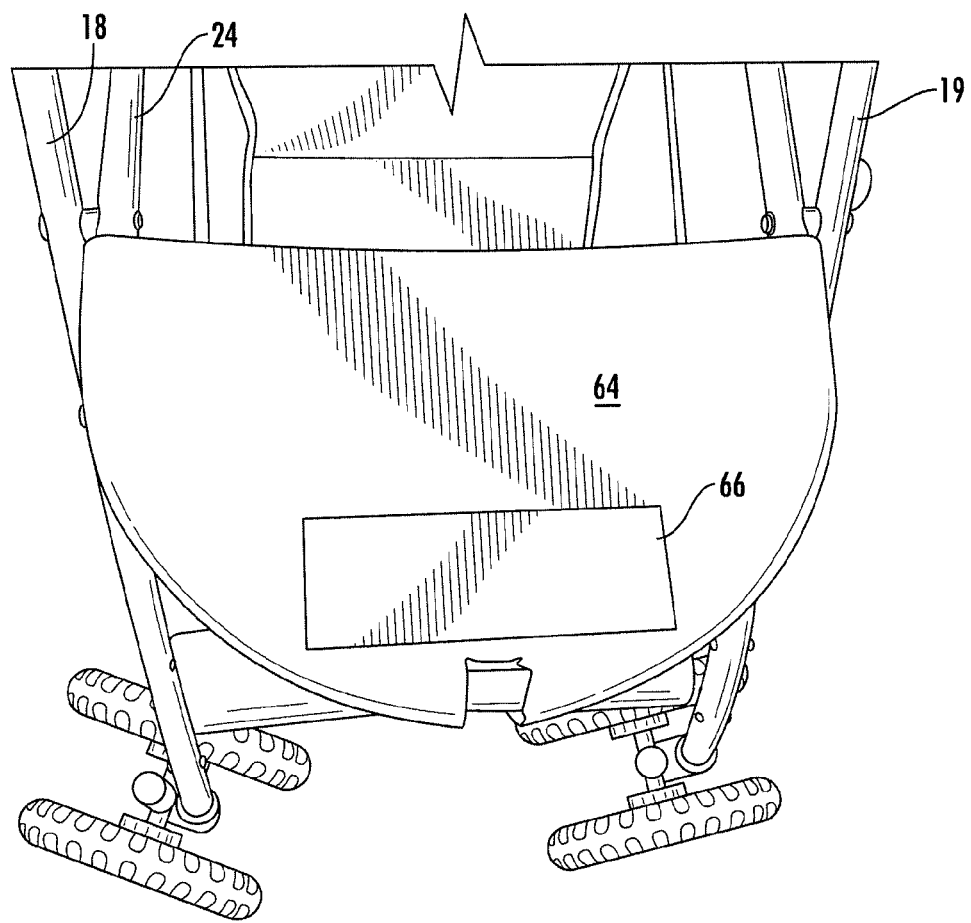
FIG. 10 is a view looking down at the platform member along with the platform cover.

A cloth platform enclosure 52 is connected to the platform enclosure member 34 and the handle 14, and defines a base and a sidewall of the pet seating area. This cloth platform enclosure 52 can be a textile cloth, non-woven cloth or a plastic membrane, and preferably is sewn together and includes at least some mesh areas in addition to solid areas. However, it could be all solid, and/or the sidewall portion could be all mesh. As used herein, "cloth" is intended to generically refer to any or all of the above with respect to the platform enclosure 52. The cloth platform enclosure 52 further can include textile fasteners and/or snaps for connection to the frame assembly 12. Preferably a baseboard 54, shown in FIG. 9, is located in or under the base portion of the cloth platform enclosure 52 to provide some stiffness to the base. This rests on the platform member bar 24 in the use position of the stroller 10 and can be disconnected from the platform member 24 upon folding the stroller 10 as shown in FIGS. 8 and 9.

The base board 54 and the cloth platform assembly 52 are preferably held to the platform member 24, as shown in FIGS. 8 and 9, by a holding clip 56 connected via its bottom 58 to the base board 54. The clip 56 preferably has an engaging portion with flexible walls 60 that can be engaged or disengaged from the platform member 24 through a snapping action. Additionally, a platform cover 64 can be provided on the platform member 24, and a hook-and-loop textile fastener 66 can be used on the platform cover 64 and a corresponding position on the bottom of the base board 54 in proximity to the clip 56. This provides for stable positioning of the pet seating area formed by the cloth platform enclosure on the frame assembly 12.

Referring again to FIGS. 1 and 5, an upper canopy bar 38 and a lower canopy bar 36 are pivotally connected to the rear pivot blocks 40, 41. The upper and lower canopy bars 38, 36 are pivotable to extend or retract a canopy over the pet seating area. A cloth canopy assembly 70 is connected to the handle 14 and the upper and lower canopy bars 38, 36. The canopy assembly 70 is preferably made from cloth 72 and includes a mesh portion 74. The cloth can be woven or non-woven textile or a polymeric membrane. The canopy could be all cloth or all mesh, if desired, or a combination of the two as shown. Alternatively, some or all of the canopy could be formed from a clear, flexible polymeric material. As used herein, "cloth" is intended to generically refer to any or all of the above with respect to the canopy assembly 70. As shown most clearly in FIGS. 3 and 5, a cutout 76 is provided in the cloth and mesh canopy assembly 70 in order to expose a front portion of the lower canopy bar 36.

An over-center latch assembly 80 is connected to the platform enclosure member 34 in a position aligned with the cutout 76 on the canopy assembly 70. The over-center latch assembly 80 is movable to a latched position in which it clamps the lower canopy bar 36 to the platform enclosure member 34 to form an enclosed pet seating area.

Figure 3:
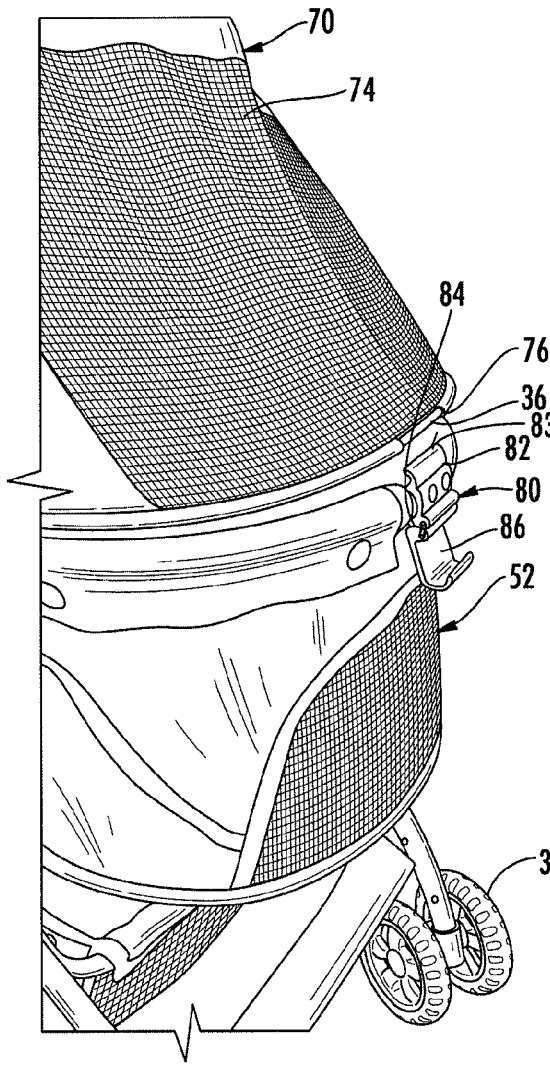
FIG. 3 is a view similar to FIG. 2 showing the over-center latch assembly in the open position.
Figure 4:
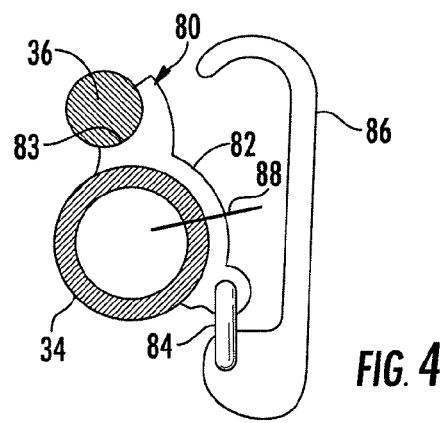
FIG. 4 is a cross-sectional view through the front of the stroller showing the over-center latch in a position prior to clamping the lower canopy bar in place.

Referring to FIGS. 3 and 4, the over-center latch assembly 80 is shown in detail and includes a base 82 adapted to the shape of the platform enclosure member 34, and has a recess 83 located at a top portion thereof which is adapted to receive a portion of the lower canopy bar 36 in the latched position. A pivot arm 84 extends from the base 82 and is connected to a latching clip 86 which can be pivoted to a position where the upper end hooks over the lower canopy bar 36 through the cutout 76 in the upper canopy assembly 70 and then the lower portion of the latching clip 86 can be moved downwardly pivoting about the connection with the pivot arm 84 which also pivots in the base 82, providing an over-center latching action when being engaged. Preferably, one or more fasteners 88 are provided to connect the over-center latch assembly 80 to the platform enclosure member 34.

Figure 7:
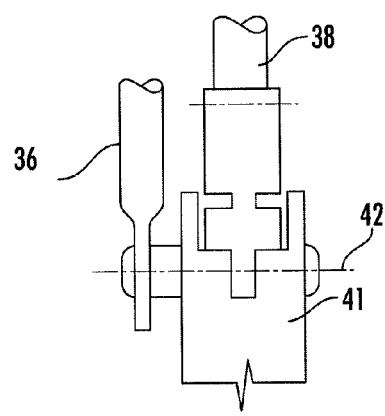
FIG. 7 is a detail view showing the assembly of the upper and lower canopy bars to the pivot block to pivot about the same axis.

Referring to FIGS. 5-7, the pet stroller 10 is shown in the use position with the canopy open. Here it can be seen that the upper and lower canopy bars 38, 36 are both connected to the rear pivot blocks 40, 41 by a pivot pin. As shown in FIG. 7, which is a detail of the right side rear pivot block 41, both the upper and lower canopy bars 38, 36 are connected to the rear pivot block 41 by a single fastener so that they are pivotable about the same axis 42. While only the right side is shown, the left side with the pivot block 40 is assembled in the same manner with the opposite ends of the upper and lower canopy bars 38, 36.

Referring to FIG. 1, a lower storage bag 50 is preferably connected to the frame assembly 12 beneath the platform member 24. This is preferably also a cloth and mesh assembly. The cloth can be a woven or non-woven textile or a polymeric membrane. Preferably, the lower storage bag 50 is connected to the rear wheel strut 16, 17 and at least one front crossbar 28.

As shown in FIGS. 1 and 5, the canopy assembly 70 is preferably connected to the handle 14 as well as the upper and lower canopy bars 38, 36. This can be done with snap or textile fasteners or through other means such as holding blocks that are attached to the cloth material of the canopy assembly and portions of the frame members using fasteners, such as screws, rivets, or other suitable connectors. In a preferred embodiment, the canopy assembly 70 is connected to a top of the cloth platform enclosure 52 such that the cloth platform enclosure 52 and the canopy assembly 70 are formed as a single textile assembly.

In order to allow folding of the pet stroller 10 to the compact stowage position as shown in FIG. 11, preferably the baseboard 54 is formed in two pieces to allow for folding. In order to fold the pet stroller 10 to the compact position shown in FIG. 11, the movable lock assemblies 22, 23 are slid upwardly on the handle 14 in order to disengage from the front pivot blocks 20, 21 and the handle is folded downwardly. Additionally, the over-center latch assembly 80 is released and the clip 86 is disengaged from the platform enclosure member 34. The baseboard 54 and the cloth platform assembly 52 is also disengaged from the platform member 24, shown in FIGS. 8 and 9, by releasing the holding clip 56 on the base board 54 from the platform member 24. The additional attachment of the cloth cover 64 to the platform member 24 via the textile hook and loop fastener 66 can also be separated.

In the use position shown in FIG. 1, the upper canopy assembly 70 can be opened or closed in order to provide access for a pet to be placed into or removed from the pet seating area defined by the cloth platform enclosure 52. The platform enclosure member 34 provides a stiff frame member so that a complete circumferential sidewall is defined around the entire pet seating area regardless of whether the canopy assembly 70 is in the closed position shown in FIG. 1 or the open position shown in FIG. 5. This arrangement allows a pet to be comfortably seated and contained regardless of the canopy position. In the closed position of the canopy assembly 70, the pet is safely contained. In order to use the pet stroller 10 with the canopy assembly 70 in the open position, a tether or leash is provided that is fastened to the frame or the baseboard within the pet seating area and can be clipped to a collar or harness on the pet. This arrangement provides for an improved pet stroller 10 in comparison to the prior known pet stroller. The pet stroller 10 provides a pet seating area with a defined platform enclosure member as part of the frame assembly as well as a cloth platform enclosure 52 with a complete continuous sidewall regardless of whether or not the canopy assembly 70 was in an open or closed position, making a safer, more pet friendly arrangement.

The frame assembly can also be for a 3 wheel stroller, and is not limited to a particular number of front or rear wheel struts. The specific construction and arrangement of the frame members and platform members can be varied. However, the platform enclosure member is provided in the use position generally parallel to the platform member, and the cloth platform enclosure is connected to the platform enclosure member and the handle or other frame portion, and is required to define the base and the sidewall of the pet seating area. The upper and lower canopy bars are also provided and are pivotally mounted to the frame assembly to extend or retract a canopy over the pet seating area. The cloth and mesh canopy assembly is connected to the handle and the upper and lower canopy bars, and has a cutout exposing a front portion of the lower canopy bar. The over-center latch assembly is connected to the platform enclosure member in a position aligned with a cutout of the canopy assembly. Other features of the invention can also be used with the 3 wheel stroller arrangement.

While the preferred embodiment of the present invention has been described in detail, it will be recognized by those skilled in the art from the present disclosure that changes may be made to the above described embodiment of the invention without departing from the broad inventive concept thereof. It is understood, therefore, that this invention covers all modifications that are within the scope and spirit of the invention as defined by the appended claims and/or shown in the attached drawings.

What is claimed is:

1. A pet stroller, comprising:
a frame assembly including:
a handle;
a platform member pivotably connected to rear wheel assemblies, with the platform member defining a platform base in a use position;
a platform enclosure member connected to the frame assembly that in the use position is generally parallel to the platform member; and
rear wheel struts, the handle has a handle portion that is located between two ends that extend away from the handle portion, the handle is connected to the rear wheel struts by rear pivot blocks spaced apart from the two ends, and two front strut members, the two ends are connected by front pivot blocks to tops of the two front strut members; movable lock assemblies are located on the handle adjacent to the ends that are lockable to the front pivot blocks such that the handle is generally aligned with the front strut members in a use position of the stroller with the lock assemblies engaged with respective ones of the front pivot blocks; a front cross bar is located between the front struts and a front wheel assembly is located below the front cross bar; and the rear wheel assemblies are located at bottom ends of the rear wheel struts;
a cloth platform enclosure connected to the platform enclosure member and the handle which defines a base and a sidewall of a pet seating area;
upper and lower canopy bars pivotably connected to the frame assembly to extend or retract a canopy over the pet seating area, the upper and the lower canopy bars are pivotably connected to the rear pivot blocks to extend or retract the canopy over the pet seating area; and
the canopy comprises a cloth canopy assembly connected to the handle and the upper and lower canopy bars; and
a latch assembly connected to the platform enclosure member that is movable to a latched position in which it clamps the lower canopy bar to the platform enclosure member to form an enclosed pet seating area.

2. The pet stroller of claim 1, wherein the upper and lower canopy bars pivotably connected to the rear pivot blocks that are pivotable about the same axis.

3. The pet stroller of claim 1, wherein two of the front wheel assemblies are located below the front cross bar.

4. The pet stroller of claim 1, wherein a lower storage bag is connected to rear struts and the front cross bar.

5. The pet stroller of claim 1, wherein the canopy assembly is connected to the handle and lower canopy bar.

6. The pet stroller of claim 1, wherein a back of the canopy assembly is connected to a top of cloth platform enclosure.

7. The pet stroller of claim 1, wherein the pet stroller is foldable to a compact position by releasing the movable lock assemblies on the ends of the handle, releasing the over-center latch, and disengaging the clip on the base board from the platform member.

* * * * *